US011070485B2

(12) United States Patent
Deek et al.

(10) Patent No.: US 11,070,485 B2
(45) Date of Patent: Jul. 20, 2021

(54) MULTIMEDIA CONTENT STEERING

(71) Applicant: Netflix, Inc., Los Gatos, CA (US)

(72) Inventors: Lara Deek, San Francisco, CA (US);
Ishaan Shastri, San Jose, CA (US);
Mohit Vora, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/705,035

(22) Filed: Dec. 5, 2019

(65) Prior Publication Data

US 2021/0176185 A1    Jun. 10, 2021

(51) Int. Cl.
*H04L 12/911* (2013.01)
*H04N 21/238* (2011.01)
(Continued)

(52) U.S. Cl.
CPC .......... *H04L 47/726* (2013.01); *H04L 47/125* (2013.01); *H04L 65/4084* (2013.01); *H04L 65/601* (2013.01); *H04L 67/02* (2013.01); *H04N 21/238* (2013.01); *H04N 21/2665* (2013.01); *H04N 21/47217* (2013.01)

(58) Field of Classification Search
None
See application file for complete search history.

(56) References Cited

U.S. PATENT DOCUMENTS 6,226,785 B1 * 5/2001 Peterson ............... G11B 27/034
717/106
6,622,171 B2 * 9/2003 Gupta ............... H04L 29/06027
709/219

(Continued)

FOREIGN PATENT DOCUMENTS

| CN | 102594679 B | 7/2015 |
|---|---|---|
| CN | 104735550 B | 2/2019 |
| WO | 2005/032057 A1 | 4/2005 |

OTHER PUBLICATIONS

International Search Report and Written Opinion received for PCT Application Serial No. PCT/US2020/053524 dated Nov. 26, 2020, 13 pages.

*Primary Examiner* — Lashonda T Jacobs
(74) *Attorney, Agent, or Firm* — FisherBroyles, LLP

(57) ABSTRACT

The disclosed computer-implemented method includes accessing information related to a playback session in which at least a portion of requested multimedia content is streamed over a network to a client electronic device. The method further includes accessing network topology information for the network to identify which route through the network was used to provide the requested multimedia content during the playback session, including indicating which end node was used to provide the multimedia content. Still further, the method includes accessing network steering factors that indicate why the requested multimedia content was steered through the identified network route, determining, based on the network steering factors, which end node would have been more suited to providing the requested multimedia content for the playback session, and then transferring the requested multimedia content to the determined end node for provisioning during subsequent playback sessions. Various other methods, systems, and computer-readable media are also disclosed.

20 Claims, 7 Drawing Sheets

(51) Int. Cl.
*H04L 12/803* (2013.01)
*H04L 29/06* (2006.01)
*H04N 21/2665* (2011.01)
*H04N 21/472* (2011.01)
*H04L 29/08* (2006.01)

(56) References Cited

U.S. PATENT DOCUMENTS

| | | | | |
|---|---|---|---|---|
| 6,662,060 | B1* | 12/2003 | Maliszewski | G11B 20/00086 |
| | | | | 348/E7.063 |
| 7,089,319 | B2* | 8/2006 | Lysenko | H04L 29/06027 |
| | | | | 370/389 |
| 7,305,357 | B2* | 12/2007 | Hamilton | G06Q 30/0641 |
| | | | | 348/E7.073 |
| 7,499,938 | B2* | 3/2009 | Collart | G11B 19/022 |
| 7,681,128 | B2* | 3/2010 | Yamamoto | G11B 19/025 |
| | | | | 715/717 |
| 7,995,756 | B1* | 8/2011 | McKinney | H04L 63/10 |
| | | | | 380/247 |
| 9,210,028 | B1* | 12/2015 | Pinson | H04L 67/2833 |
| 9,871,850 | B1* | 1/2018 | Brandwine | H04L 45/306 |
| 10,250,925 | B2* | 4/2019 | Agrawal | G10L 21/057 |
| 10,771,865 | B2* | 9/2020 | Watson | H04N 21/8541 |
| 10,931,778 | B2* | 2/2021 | Paranjpe | H04L 45/122 |
| 2006/0088063 | A1 | 4/2006 | Hartung et al. | |
| 2009/0168795 | A1* | 7/2009 | Segel | H04L 67/1076 |
| | | | | 370/429 |
| 2011/0082916 | A1* | 4/2011 | Swanson | H04L 29/08081 |
| | | | | 709/219 |
| 2012/0084460 | A1* | 4/2012 | McGinnity | H04L 67/327 |
| | | | | 709/242 |
| 2012/0106446 | A1 | 5/2012 | Yousefi et al. | |
| 2013/0086631 | A1* | 4/2013 | Archer | H04L 63/10 |
| | | | | 726/1 |
| 2013/0301429 | A1* | 11/2013 | Peters | H04W 40/02 |
| | | | | 370/252 |
| 2014/0143670 | A1* | 5/2014 | Swaminathan | G06F 3/0481 |
| | | | | 715/720 |
| 2014/0212107 | A1* | 7/2014 | Saint-Jean | G11B 27/031 |
| | | | | 386/241 |
| 2014/0280906 | A1 | 9/2014 | Johns et al. | |
| 2015/0012661 | A1* | 1/2015 | Elmore | H04L 65/4084 |
| | | | | 709/231 |
| 2015/0142910 | A1* | 5/2015 | Harrang | H04L 67/2847 |
| | | | | 709/213 |
| 2015/0242397 | A1* | 8/2015 | Zhuang | H04L 69/40 |
| | | | | 707/827 |
| 2015/0243329 | A1* | 8/2015 | Hadorn | H04N 21/8455 |
| | | | | 386/230 |
| 2015/0381706 | A1* | 12/2015 | Wohlert | H04L 67/10 |
| | | | | 709/201 |
| 2017/0013040 | A1 | 1/2017 | Ponekker et al. | |
| 2017/0238026 | A1* | 8/2017 | Agrawal | G06F 3/167 |
| | | | | 725/14 |
| 2017/0273044 | A1* | 9/2017 | Alsina | H04L 67/104 |
| 2017/0302575 | A1 | 10/2017 | Ward et al. | |
| 2018/0248948 | A1* | 8/2018 | Rementilla | H04N 21/43615 |
| 2018/0270284 | A1 | 9/2018 | Lee et al. | |
| 2019/0028751 | A1* | 1/2019 | Bolot | H04N 21/26258 |
| 2019/0281133 | A1 | 9/2019 | Tomkins | |
| 2019/0296947 | A1* | 9/2019 | Major | H04L 65/80 |
| 2019/0312810 | A1 | 10/2019 | Strom et al. | |
| 2020/0084486 | A1* | 3/2020 | Cho | H04N 21/44204 |
| 2020/0221180 | A1* | 7/2020 | Pietsch | H04N 21/4126 |
| 2020/0304868 | A1* | 9/2020 | Ganjam | H04N 21/25808 |
| 2021/0044855 | A1* | 2/2021 | de Boursetty | H04N 21/234 |

* cited by examiner

MULTIMEDIA CONTENT STEERING

BACKGROUND

In content distribution networks, content frequently requested by electronic devices is typically placed on edge nodes that are near the requesting electronic devices. Because electronic device users usually expect their content to be delivered within seconds, traditional systems have created algorithms to determine which content to place on these edge nodes. These algorithms are designed to look at log files to determine which edge node served which portion of content and when it was delivered. For example, each edge node may track which files it transmits to which users in the log file. Then, the algorithm notes which files were transmitted and maintains or removes files from the edge nodes based on this log file analysis. Such an algorithm does not, however, inform system administrators as to which content would have been requested had different content been placed on the edge nodes.

SUMMARY

As will be described in greater detail below, the present disclosure describes embodiments for steering content and requests for content to optimal end nodes within a computer network.

In one example, a computer-implemented method for steering multimedia content includes accessing information related to a playback session in which at least a portion of requested multimedia content is streamed over a network to a client electronic device. The accessed information includes properties associated with the client electronic device. The network includes multiple end nodes that are each configured to host and serve multimedia content. The method also includes accessing network topology information for the network to identify which route through the network was used to provide the requested multimedia content during the playback session, including indicating which end node was used to provide the multimedia content. The method further includes accessing network steering factors that indicate why the requested multimedia content was steered through the identified network route, and determining, based on the network steering factors, which end node would have been more suited to providing the requested multimedia content for the playback session. The method also includes transferring the requested multimedia content to the determined end node for provisioning during subsequent playback sessions.

In some examples, the method further includes receiving a request from the client electronic device for multimedia content, and steering the received request to the determined end node to which the requested multimedia content was transferred.

In some examples, the network steering factors include a health indicator of the end node that provided the multimedia content, a distance indicator indicating a physical distance between the client electronic device and the end node that provided the multimedia content, an expected latency measurement between the client electronic device and the end node, or an agreement with an internet service provider (ISP) indicating an amount of multimedia content that is to be provided by the end node.

In some examples, the method further includes providing, as an output for each playback session, an indication of which end node would have been more suited to providing the requested multimedia content for the playback session.

In some examples, the method further includes providing, as an output for each playback session, an indication of which route through the network was used to provide the requested multimedia content during the playback session. In some examples, the method further includes providing, as an output for each playback session, an indication of why the specified route through the network was used to provide the requested multimedia content during the playback session.

In some examples, the indication of why the specified route through the network was used to provide the requested multimedia content during the playback session specifies a computing resource health measurement for the end node that was used to provide the multimedia content.

In some examples, the indication of why the specified route through the network was used to provide the requested multimedia content during the playback session indicates that requested content was not available on a node that would have been more suited to providing the requested multimedia content for the playback session.

In some examples, the indication of why the specified route through the network was used to provide the requested multimedia content during the playback session indicates that the client electronic device switched to a second, different end node configured to host and serve multimedia content. In some examples, the determined node is a multimedia content provisioning system. In such cases, the multimedia content provisioning system includes a specified amount of preloaded multimedia content stored thereon.

In addition, a corresponding system includes at least one physical processor and physical memory comprising computer-executable instructions that, when executed by the physical processor, cause the physical processor to: access information related to a playback session in which at least a portion of requested multimedia content is streamed over a network to a client electronic device. The accessed information includes properties associated with the client electronic device. The network includes multiple end nodes that are each configured to host and serve multimedia content. The physical processor also accesses network topology information for the network to identify which route through the network was used to provide the requested multimedia content during the playback session, including indicating which end node was used to provide the multimedia content. Still further, the physical processor accesses network steering factors that indicate why the requested multimedia content was steered through the identified network route. The physical processor then determines, based on the network steering factors, which end node would have been more suited to providing the requested multimedia content for the playback session, and transfers the requested multimedia content to the determined end node for provisioning during subsequent playback sessions.

In some examples, the physical processor further receives a request from the client electronic device for multimedia content, determines a current physical location of the client electronic device, and ranks at least some of the end nodes on a scale based on which end nodes are closest to the current physical location of the client electronic device.

In some examples, the ranking is further based on whether the portions of multimedia content requested by the client electronic device are stored on each end node. In some examples, the received request is steered to the end node with the highest ranking. In some examples, the physical processor provides, as an output, various portions of ranking logic that were used when determining the ranking. In some examples, the request received from the client electronic device is steered to an end node that is optimized for mobile electronic devices. In other cases, the request received from the client electronic device is steered to an end node that is optimized for stationary electronic devices. In some examples, the physical processor determines an optimal end node hosting and serving capacity that will provision a maximal amount of multimedia requests using the end nodes, while minimizing the number of requests that are sent to other nodes in the network. In some examples, the physical processor instantiates an end node that has the determined optimal hosting and serving capacity that will provision a maximal amount of multimedia requests using the end nodes, while minimizing the number of requests that are sent to other nodes in the network, and transfers the multimedia content to the determined end node for provisioning during subsequent playback sessions.

In some examples, the above-described method is encoded as computer-readable instructions on a computer-readable medium. For example, a computer-readable medium may include one or more computer-executable instructions that, when executed by at least one processor of a computing device, cause the computing device to access information related to a playback session in which at least a portion of requested multimedia content is streamed over a network to a client electronic device, where the accessed information includes properties associated with the client electronic device, and where the network includes multiple end nodes that are each configured to host and serve multimedia content, access network topology information for the network to identify which route through the network was used to provide the requested multimedia content during the playback session, including indicating which end node was used to provide the multimedia content, access network steering factors that indicate why the requested multimedia content was steered through the identified network route, determine, based on the network steering factors, which end node would have been more suited to providing the requested multimedia content for the playback session, and transfer at least a portion of the requested multimedia content to the determined end node for provisioning during subsequent playback sessions.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
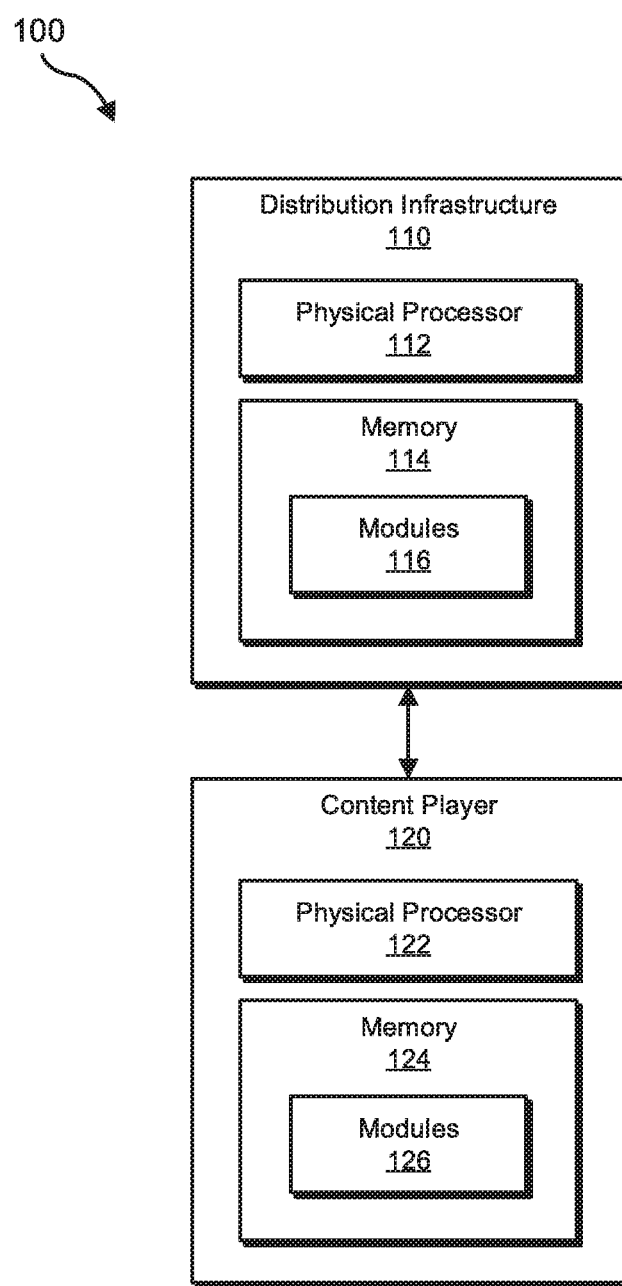
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to steering content and content requests to optimal end nodes within a computer network. As noted above, content delivery networks may be designed to place content close to the users that request the content. Within these content delivery networks, content (e.g., movies, images, web pages, podcasts, and other downloadable information) is placed on edge nodes that are geographically distributed in specific locations to service user requests. User requests travel through the network and are received at edge nodes. If the edge node has the requested content, the edge node may provide the content to the requesting user device. If the edge node does not have the requested content, the user's request is passed to another node in the network that has the content. Because each hop between nodes takes time, content delivery networks try to ensure that end nodes store the most frequently requested content within that location. The end nodes, however, do not have unlimited storage capacity. As such, content that is no longer requested or is not requested often enough is pulled from the edge node to make room for new content that is more desirable. Knowing which content to place on edge nodes and knowing when to change out old content for new content may be difficult to determine.

Many traditional systems attempt to perform this task by analyzing log files and reacting accordingly. For example, a given node may provide content X, content Y, and content Z many thousands of times on a given day. This information may be stored in a log, indicating when and to whom each file was transmitted. Over time, this log file may list, for each portion of content, when it was accessed, by whom, and how many times it was accessed over a given time period. Thus, by analyzing the log file, an administrator may be able to see when content Y, for example, is being accessed and how many times it is being accessed. If the number of requests for content Y is too low, then content Y will be pulled from the edge node and new content will be loaded onto the edge node in its place. This simplistic form of analyzing a log and then reacting based on the log information, however, does not ensure that each edge node is providing the optimal content. For instance, this traditional log analysis method would not be able to determine which content would have been accessed on a given edge node if that edge node did not have that content. Still further, the traditional log analysis method would not provide additional information helpful to an administrator indicating why a given route to the content was taken over the mobile network, or why a user switched away to a different edge node to access the content.

As will be explained in greater detail below, the embodiments described herein may perform such functions, including indicating why a given network route was used to serve a certain portion of content, or why a user switched to a different edge node. In one embodiment, a method is provided which includes accessing information related to a playback session in which at least a portion of requested multimedia content is streamed over a network to a client electronic device. The accessed information includes properties associated with the client electronic device. The network includes multiple end nodes that are each configured to host and serve multimedia content. The method further includes accessing network topology information for the network to identify which route through the network was used to provide the requested multimedia content during the playback session, including indicating which end node was used to provide the multimedia content. The method also includes accessing network steering factors that indicate why the requested multimedia content was steered through the identified network route. The method further determines, based on at least one of the network steering factors, which end node would have been more suited to providing the requested multimedia content for the playback session and transfers at least a portion of the requested multimedia content to the determined end node for provisioning during subsequent playback sessions.

Figure 2:
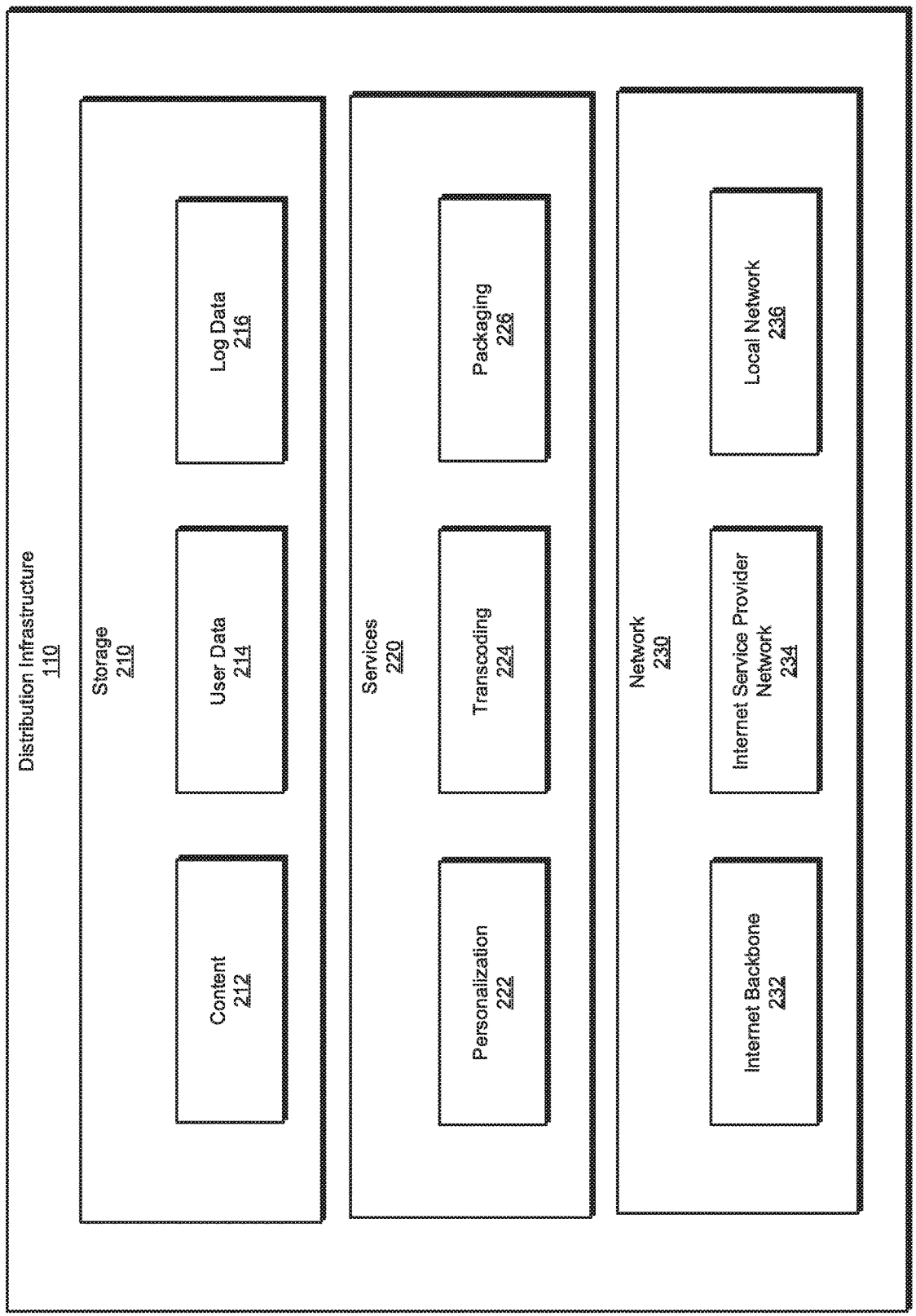
FIG. 2 is a block diagram of an exemplary distribution infrastructure within the content distribution ecosystem shown in FIG. 1.
Figure 3:
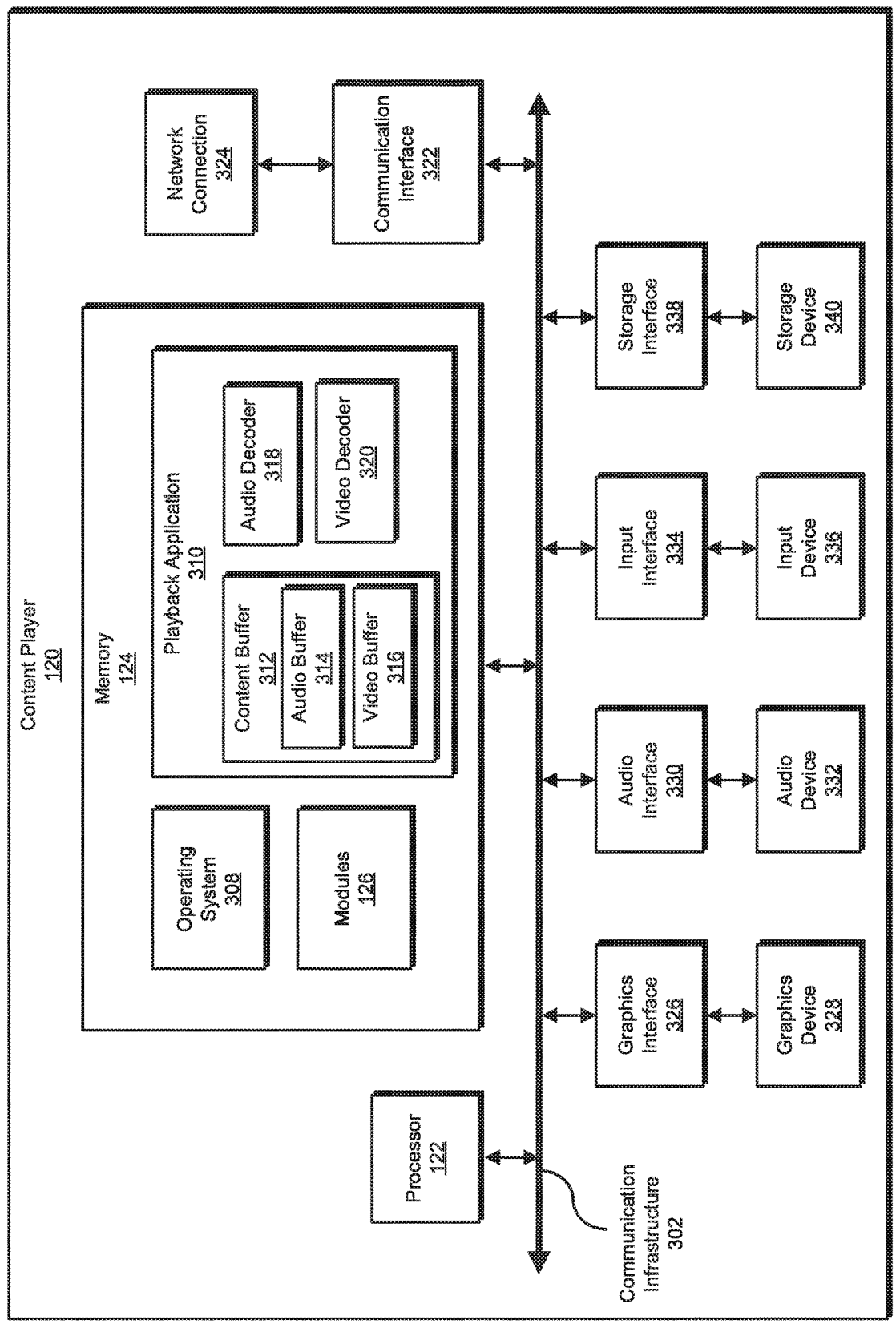
FIG. 3 is a block diagram of an exemplary content player within the content distribution ecosystem shown in FIG. 1.

The following will provide, with reference to FIG. 1, detailed descriptions of exemplary ecosystems in which content is provisioned to end nodes and in which requests for content are steered to specific end nodes. The discussion corresponding to FIGS. 2 and 3 presents an overview of an exemplary distribution infrastructure and an exemplary content player used during playback sessions, respectively. Detailed descriptions of corresponding computer-implemented methods for adaptive streaming of multimedia content will be provided in connection with FIG. 4.

FIG. 1 is a block diagram of a content distribution ecosystem 100 that includes a distribution infrastructure 110 in communication with a content player 120. In some embodiments, distribution infrastructure 110 is configured to encode data at a specific data rate and to transfer the encoded data to content player 120. Content player 120 is configured to receive the encoded data via distribution infrastructure 110 and to decode the data for playback to a user. The data provided by distribution infrastructure 110 includes, for example, audio, video, text, images, animations, interactive content, haptic data, virtual or augmented reality data, location data, gaming data, or any other type of data that is provided via streaming.

Distribution infrastructure 110 generally represents any services, hardware, software, or other infrastructure components configured to deliver content to end users. For example, distribution infrastructure 110 includes content aggregation systems, media transcoding and packaging services, network components, and/or a variety of other types of hardware and software. In some cases, distribution infrastructure 110 is implemented as a highly complex distribution system, a single media server or device, or anything in between. In some examples, regardless of size or complexity, distribution infrastructure 110 includes at least one physical processor 112 and at least one memory device 114. One or more modules 116 are stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 includes a physical processor 122, memory 124, and one or more modules 126. Some or all of the adaptive streaming processes described herein is performed or enabled by modules 126, and in some examples, modules 116 of distribution infrastructure 110 coordinate with modules 126 of content player 120 to provide adaptive streaming of multimedia content.

In certain embodiments, one or more of modules 116 and/or 126 in FIG. 1 represent one or more software applications or programs that, when executed by a computing device, cause the computing device to perform one or more tasks. For example, and as will be described in greater detail below, one or more of modules 116 and 126 represent modules stored and configured to run on one or more general-purpose computing devices. One or more of modules 116 and 126 in FIG. 1 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 access and/or modify one or more of modules 116 and 126, respectively. Additionally or alternatively, physical processors 112 and 122 execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 stores, loads, and/or maintains one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 includes storage 210, services 220, and a network 230. Storage 210 generally represents any device, set of devices, and/or systems capable of storing content for delivery to end users. Storage 210 includes a central repository with devices capable of storing terabytes or petabytes of data and/or includes distributed storage systems (e.g., appliances that mirror or cache content at Internet interconnect locations to provide faster access to the mirrored content within certain regions). Storage 210 is also configured in any other suitable manner.

As shown, storage 210 may store a variety of different items including content 212, user data 214, and/or log data 216. Content 212 includes television shows, movies, video games, user-generated content, and/or any other suitable type or form of content. User data 214 includes personally identifiable information (PII), payment information, preference settings, language and accessibility settings, and/or any other information associated with a particular user or content player. Log data 216 includes viewing history information, network throughput information, and/or any other metrics associated with a user's connection to or interactions with distribution infrastructure 110.

Services 220 includes personalization services 222, transcoding services 224, and/or packaging services 226. Personalization services 222 personalize recommendations, content streams, and/or other aspects of a user's experience with distribution infrastructure 110. Encoding services 224 compress media at different bitrates which, as described in greater detail below, enable real-time switching between different encodings. Packaging services 226 package encoded video before deploying it to a delivery network, such as network 230, for streaming.

Network 230 generally represents any medium or architecture capable of facilitating communication or data transfer. Network 230 facilitates communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 includes an Internet backbone 232, an internet service provider 234, and/or a local network 236. As discussed in greater detail below, bandwidth limitations and bottlenecks within one or more of these network segments triggers video and/or audio bit rate adjustments.

FIG. 3 is a block diagram of an exemplary implementation of content player 120 of FIG. 1. Content player 120 generally represents any type or form of computing device capable of reading computer-executable instructions. Content player 120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 includes a communication infrastructure 302 and a communication interface 322 coupled to a network connection 324. Content player 120 also includes a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 stores and/or loads an operating system 308 for execution by processor 122. In one example, operating system 308 includes and/or represents software that manages computer hardware and software resources and/or provides common services to computer programs and/or applications on content player 120.

Operating system 308 performs various system management functions, such as managing hardware components (e.g., graphics interface 326, audio interface 330, input interface 334, and/or storage interface 338). Operating system 308 also provides process and memory management models for playback application 310. The modules of playback application 310 includes, for example, a content buffer 312, an audio decoder 318, and a video decoder 320.

Playback application 310 is configured to retrieve digital content via communication interface 322 and play the digital content through graphics interface 326. Graphics interface 326 is configured to transmit a rendered video signal to graphics device 328. In normal operation, playback application 310 receives a request from a user to play a specific title or specific content. Playback application 310 then identifies one or more encoded video and audio streams associated with the requested title. After playback application 310 has located the encoded streams associated with the requested title, playback application 310 downloads sequence header indices associated with each encoded stream associated with the requested title from distribution infrastructure 110. A sequence header index associated with encoded content includes information related to the encoded sequence of data included in the encoded content.

In one embodiment, playback application 310 begins downloading the content associated with the requested title by downloading sequence data encoded to the lowest audio and/or video playback bit rates to minimize startup time for playback. The requested digital content file is then downloaded into content buffer 312, which is configured to serve as a first-in, first-out queue. In one embodiment, each unit of downloaded data includes a unit of video data or a unit of audio data. As units of video data associated with the requested digital content file are downloaded to the content player 120, the units of video data are pushed into the content buffer 312. Similarly, as units of audio data associated with the requested digital content file are downloaded to the content player 120, the units of audio data are pushed into the content buffer 312. In one embodiment, the units of video data are stored in video buffer 316 within content buffer 312 and the units of audio data are stored in audio buffer 314 of content buffer 312.

A video decoder 320 reads units of video data from video buffer 316 and outputs the units of video data in a sequence of video frames corresponding in duration to the fixed span of playback time. Reading a unit of video data from video buffer 316 effectively de-queues the unit of video data from video buffer 316. The sequence of video frames is then rendered by graphics interface 326 and transmitted to graphics device 328 to be displayed to a user.

An audio decoder 318 reads units of audio data from audio buffer 314 and output the units of audio data as a sequence of audio samples, generally synchronized in time with a sequence of decoded video frames. In one embodiment, the sequence of audio samples are transmitted to audio interface 330, which converts the sequence of audio samples into an electrical audio signal. The electrical audio signal is then transmitted to a speaker of audio device 332, which, in response, generates an acoustic output.

In situations where the bandwidth of distribution infrastructure 110 is limited and/or variable, playback application 310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 326 is configured to generate frames of video data and transmit the frames of video data to graphics device 328. In one embodiment, graphics interface 326 is included as part of an integrated circuit, along with processor 122. Alternatively, graphics interface 326 is configured as a hardware accelerator that is distinct from (i.e., is not integrated within) a chipset that includes processor 122.

Graphics interface 326 generally represents any type or form of device configured to forward images for display on graphics device 328. For example, graphics device 328 is fabricated using liquid crystal display (LCD) technology, cathode-ray technology, and light-emitting diode (LED) display technology (either organic or inorganic). In some embodiments, graphics device 328 also includes a virtual reality display and/or an augmented reality display. Graphics device 328 includes any technically feasible means for generating an image for display. In other words, graphics device 328 generally represents any type or form of device capable of visually displaying information forwarded by graphics interface 326.

As illustrated in FIG. 3, content player 120 also includes at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 also includes a storage device 340 coupled to communication infrastructure 302 via a storage interface 338. Storage device 340 generally represents any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems are included in or connected to content player 120. Conversely, one or more of the components and devices illustrated in FIG. 3 need not be present to practice the embodiments described and/or illustrated herein. The devices and subsystems referenced above are also interconnected in different ways from that shown in FIG. 3. Content player 120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 120. All or a portion of the computer program stored on the computer-readable medium is then stored in memory 124 and/or storage device 340. When executed by processor 122, a computer program loaded into memory 124 causes processor 122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 120 is configured as an Application Specific Integrated Circuit (ASIC) adapted to implement one or more of the example embodiments disclosed herein.

Figure 4:
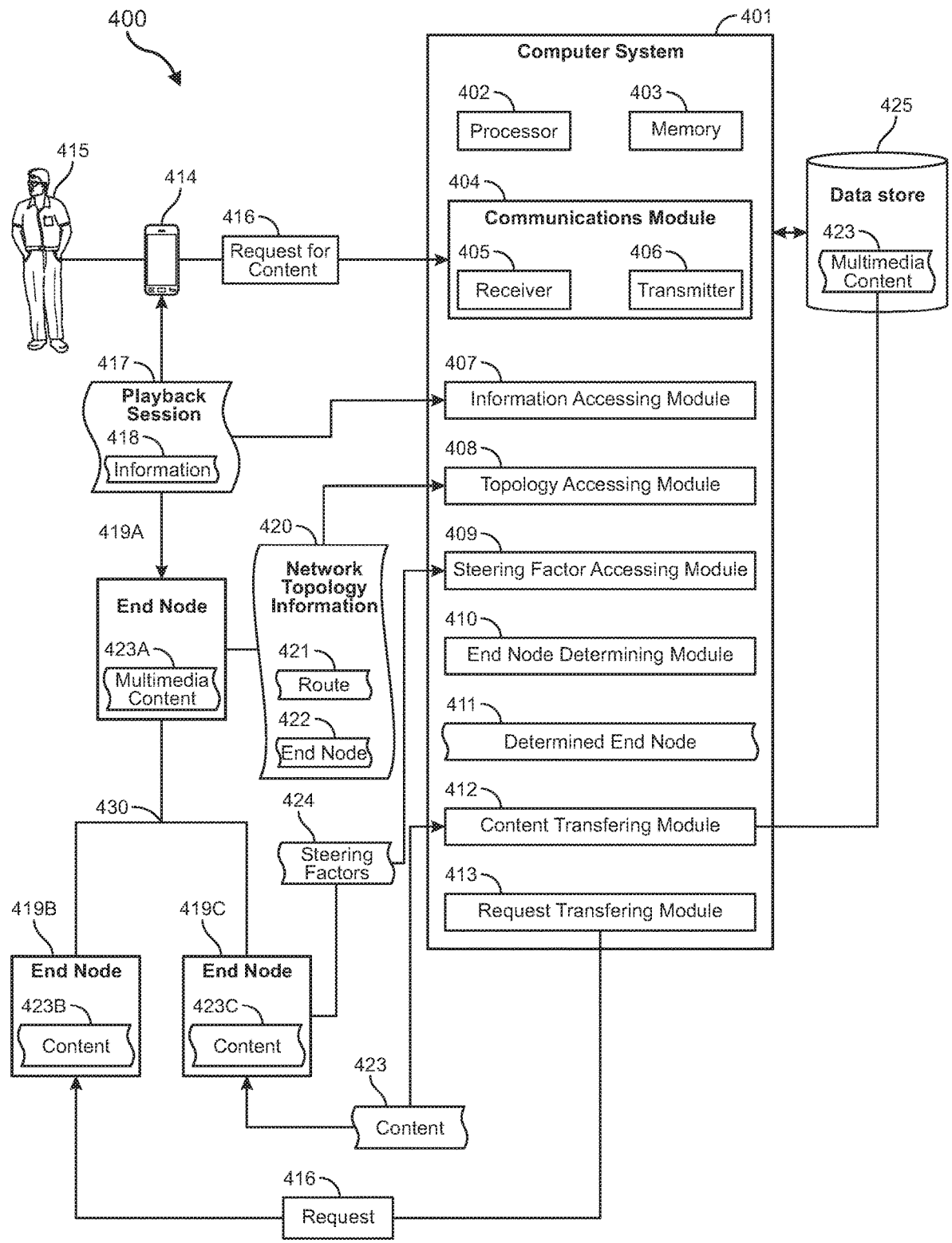
FIG. 4 illustrates a computing architecture in which content and content requests are steered to optimal end nodes within a computer network.

FIG. 4 illustrates a computing environment 400 that includes a computer system 401. The computer system 401 is substantially any type of computing system including a local computing system or a distributed (e.g., cloud) computing system. The computer system 401 includes at least one processor 402 and at least some system memory 403. The computer system 401 includes program modules for performing a variety of different functions. The program modules are hardware-based, software-based, or include a combination of hardware and software. Each program module uses computing hardware and/or software to perform specified functions, including those described herein below.

The computer system 401 also includes a communications module 404 that is configured to communicate with other computer systems. The communications module 404 includes any wired or wireless communication means that can receive and/or transmit data to or from other computer systems. These communication means include hardware interfaces including Ethernet adapters, WIFI adapters, hardware radios including, for example, a hardware-based receiver 405, a hardware-based transmitter 406, or a combined hardware-based transceiver capable of both receiving and transmitting data. The radios are cellular radios, Bluetooth radios, global positioning system (GPS) radios, or other types of radios. The communications module 404 is configured to interact with databases, mobile computing devices (such as mobile phones or tablets), embedded or other types of computing systems.

The computer system 401 also includes an information accessing module 407. When a client device 414 (e.g., belonging to user 415) requests multimedia or other types of content, that content is provided by an end node (e.g., node 419A, node 419B, and/or 419C, any or all of which may be multimedia content provisioning systems. In some cases, the content (e.g., 423A) is transmitted to the client device 414 as part of a playback session 417. During the playback session 417, various content is provided to the client device 414 from end nodes of the network. During or after the playback session 417, the computer system 401 gathers, receives, or accesses information 418 related to the playback session. This information 418 is transmitted to computer system 401 by the end nodes 419A-C or may be gleaned from monitoring the playback session 417. In some cases, the computer system 401 is an end node itself, while in other cases, the computer system 401 is a separate isolated or distributed computing system that is communicatively connected to one or more of the end nodes 419A-C or to a computer network 430 of which the end nodes are a part.

Once this information 418 related to the playback session 417 has been accessed by the information accessing module 407, the topology accessing module 407 accesses network topology information 420. This network topology information 420 is received from any of the end nodes 419A-C or from other nodes on the network 430. The network topology information 420 includes route information 421 indicating the route through the network 430 used to provide the requested content. Thus, for example, if the client device 414 sent a request for content 416 to computer system 401, the request 416 is sent to the end node that is storing the requested content and is available to provide the content.

For instance, in one example, the requested content is stored on end node 419C and includes content 423C. The content 423C is then transmitted to the client device 414 in a playback session 417. In some cases, the content 423C is transmitted directly to the client device 414, while in other cases, the content follows a more circuitous route through the network 430. Likewise, the request for content 416 could also take a circuitous route through the network 430, bounding from node to node until arriving at the end node 419C that includes the requested content 423C. The topology accessing module 408 accesses the network topology information 420 to determine which route 421 the request 416 and/or the content 423C took through the network 430, along with an indication 422 of which nodes were part of provisioning the content.

The steering factor accessing module 409 of computer system 401 then accesses one or more steering factors 424 to determine why that route through the network 430 was used. There are various reasons why a given end node is used or not used to provide requested content including the geographical relationship between the client device and the end node providing the content, the availability of the content on a selected end node, the health of the end node that is to provide the content, the client's device switching to a different network or end node, or other reasons. These reasons shed light on why a given route through the network 430 was used to provide the requested content. The steering factors 424 are used to determine why a given network route was used and potentially also why a given network route was not used to provide the content. As the term is used herein, "steering" refers to directing content or directing client requests for content to a specified end node or other network location.

The end node determining module 410 of computer system 101 then determines whether there was a node that was better suited to provide the requested content. If there was a better-suited node, an indication of that determined node 411 is passed to the content transferring module 412 which transfers the content 423 from a data store 425 (which is part of or separate from computer system 401) to the determined end node 411. In this manner, content is provisioned to those nodes that are better-suited to providing that portion of content. Thus, in contrast to traditional systems that merely look at log data and move the data off of end nodes when the content is stale, the embodiments herein identify which network routes were taken for certain requests and certain playback sessions and determine whether another end node would be better suited to providing that content. If so, that content is preloaded onto the better-suited edge nodes, thereby ensuring that each edge node is storing optimal content based on one or many different steering factors. These concepts will be explained in greater detail below with regard to method 500 of FIG. 5 and the embodiments illustrated in FIGS. 6-9.

Figure 5:
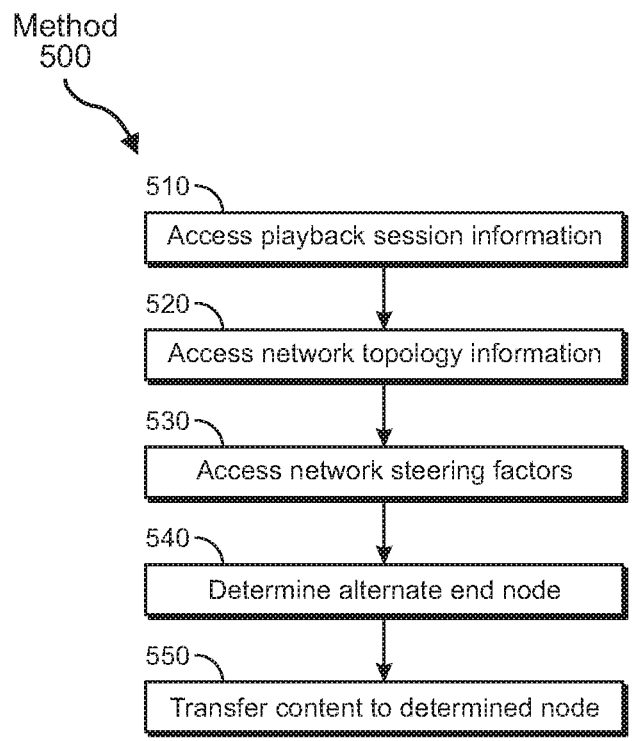
FIG. 5 illustrates a flow diagram of an exemplary method for steering content and content requests to optimal end nodes within a computer network.

FIG. 5 is a flow diagram of an exemplary computer-implemented method 500 for steering content and content requests to optimal end nodes within a computer network. The steps shown in FIG. 4 is performed by any suitable computer-executable code and/or computing system, including the system illustrated in FIG. 4. In one example, each of the steps shown in FIG. 5 represents an algorithm whose structure includes and/or is represented by multiple sub-steps, examples of which will be provided in greater detail below.

As illustrated in FIG. 5, at step 510, the information accessing module 407 of FIG. 4 accesses information 418 related to a playback session 417 in which at least a portion of requested multimedia content 423 is streamed over a network to a client electronic device 414. The network 430 may be any type of wired or wireless network, and the client electronic device 414 may be any type of mobile or stationary computing system. The accessed information 418 includes properties associated with the client electronic device 414. The properties may indicate the type of device, the internet protocol address of the device, the international mobile equipment identity (IMEI) number, the media access control (MAC) address, type of operating system, amount of currently available random access memory (RAM), total amount of RAM, amount of currently available non-volatile storage (e.g., flash memory), total amount of non-volatile storage, central processing unit (CPU) speed, graphics processing unit (GPU) speed, current location (e.g., global positioning system (GPS) coordinates) or approximate location based on connections to WiFi, Bluetooth, or cellular networks, type of application being used to access the multimedia content 423, or other information.

The network 430 includes multiple end nodes 419A-C that are each configured to host and serve multimedia content (e.g., content 423A-C, respectively). The end nodes are connected to a central computing system or network controller (e.g., computer system 401). This central computing system may determine which content is stored on each of the end nodes 419A-C. The central computing system may also receive requests for content and steer those requests to the proper end node for provisioning to the client device as part of a playback session. The information 418 from the playback session 417 is used, at least in part, to determine why a given request for content (e.g., request 416) was steered to a specific end node, and is further used to determine if a more optimal end node should have been used to provide the requested content.

The topology accessing module 408 then accesses, at step 520 of method 500, network topology information 420 for the network 430 to identify which route through the network was used to provide the requested multimedia content during the playback session. The route 421 indicates which end node (e.g., 419A-C) was used to provide the multimedia content 423. The network topology information 420 indicates how many end nodes are part of the network 430. The network topology information 420 also indicates where those end nodes are physically located, and which content is stored on each end node. Over time, as content becomes stale, the computer system 401 ensures that older, stale content is removed from the end nodes and that newer, more popular content is placed on the end nodes. The network topology information also indicates whether a central computer system is part of the network 430 and whether any intermediary nodes exist between the client electronic device 416 and the central computer system, and between the central computer system and the end nodes. Thus, the network topology information 420 provides knowledge of all possible routes between the client electronic device 414, the central computer system 401, and the end nodes 419A-C. This information is then used to determine, for any given client request, which end node would have been better suited to provide the requested content to the client. The suitability of an end node to provide the content is based on one or more steering factors 424.

Method 500 of FIG. 5 next includes accessing, at step 530, one or more network steering factors 424 that indicate why the requested multimedia content was steered through the identified network route. For example, in some cases, the request for content 416 from the client device is routed directly to the central computer system 401 but is routed through multiple different nodes before finally reaching end node 419B which has content 423B. The end node 419A may have been physically closer to the client electronic device and may have had the requested content. However, because of the health of the end node 419A, for example, the client device's request 416 was routed to end node 419B. Thus, in this example, end node 419A was better suited to provide the requested multimedia content, but the route ultimately selected led to end node 419B. Other examples of network steering factors will be described further below with regard to FIG. 7.

Method 500 of FIG. 5 further includes determining, at step 540, based on at least one of the network steering factors 424, which end node would have been more suited to providing the requested multimedia content for the playback session 417 and, at step 550, transferring at least a portion of the requested multimedia content 423 to the determined end node 411 for provisioning during subsequent playback sessions. The end node determining module 410 of computer system 401, for example, uses the steering factors 424 to determine which end node in network 430 would have been better suited to provide the requested content 423. Then, once the optimal end node has been determined, the content transferring module 412 transfers content from data store 425 (or from other data source) to the determined end node 411. In this manner, the content stored and provisioned from any given end node is continually analyzed and adjusted. If a certain end node provides requested content, but a different end node could have provided the content in a more efficient manner (e.g., faster or using less bandwidth or without switching to another node or another network), that end node will be identified and used for provisioning subsequent multimedia content requests.

In some cases, after the multimedia content 423 requested by the client device 414 has been transmitted to and stored on the determined end node 411 (which may be any of end nodes 419A-C), the computer system 401 may begin routing subsequent requests to that end node. For example, if another client electronic device sends a request for content 416 to computer system 401, the request transferring module 413 steers that received request to the determined end node 411 to which the requested multimedia content was transferred. Thus, when possible, future requests for the content that was moved to a specific end node based on the steering factors are routed to that end node. Once the end node has been identified, that end node is initialized to stream or otherwise transfer the requested content to the client device.

Figure 6:
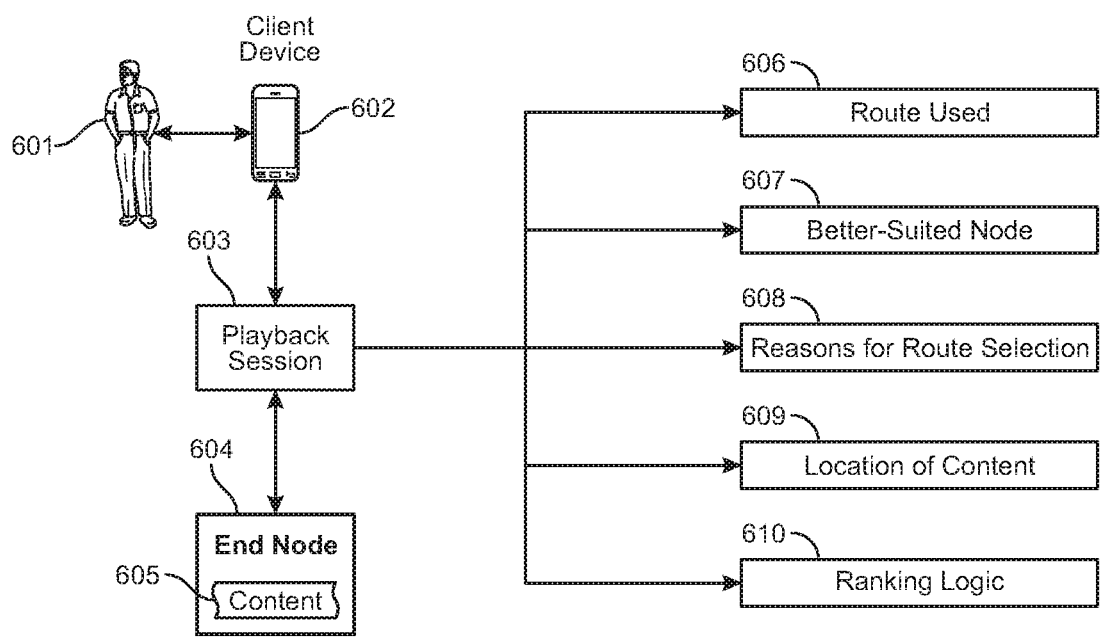
FIG. 6 illustrates an embodiment in which various types of information are extracted from a playback session.
Figure 7:
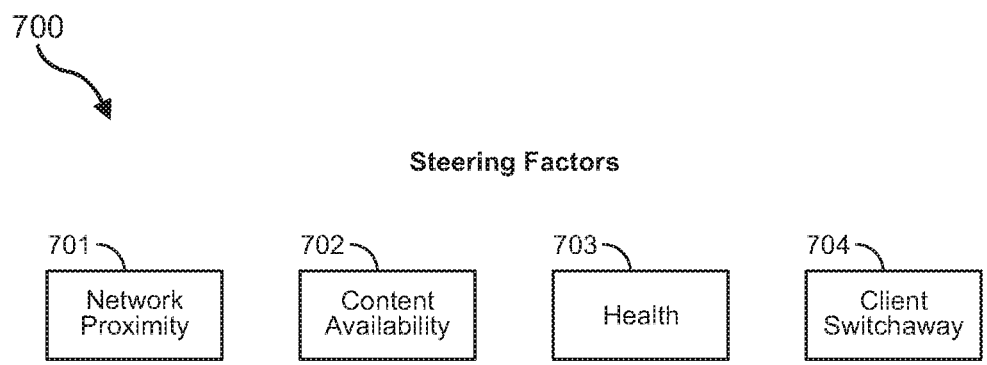
FIG. 7 illustrates an embodiment in which different steering factors are provided for determining why a specific network route was selected to deliver content.

During the playback session 417 between the determined end node 411 and the client electronic device 414, the determined end node provides information 418 regarding the playback session, or the central computer system 401 monitors the playback session and gathers information related to that session. In some cases, for example, as shown in FIG. 6, an end node 604 is providing content 605 to user 601's client electronic device 602 via a playback session 603. In some cases, the central computer system 401 of FIG. 4 or the end node 604 itself provides, as an output, an indication of which route through the network 606 was used to provide the requested multimedia content during the playback session 603. The network route used 606 to provide the requested content 605 is used when determining if another node would have been more optimally suited to provide the requested content. By analyzing the topology of the network and by determining which route to the requested content was actually used, the end node determining module 410 of FIG. 4 may determine which of the end nodes would have been better suited to providing the requested multimedia content for the playback session. This information 607 is also provided as an output from the playback session 603.

As illustrated in FIG. 6, other information related to the playback session 603 is also output by the end node 604 or by the central computer system 401 of FIG. 4. For example, in some cases, the end node 605 or a central computing system provides, as an output for the playback session 603, an indication of why the specified route through the network was used to provide the requested multimedia content during the playback session (e.g., 608). This indication of why a given route was take 608 includes an analysis of different steering factors including one or more of the steering factors 700 of FIG. 7.

In one embodiment, the indication of why the specified route through the network was used to provide the requested multimedia content during the playback session 608 includes an indication of network proximity 701. In some cases, a route through the network is selected based on an end node's proximity to the client device. Thus, if end node 604 is physically closer to the client device 602 (and has the requested content), that end node will be selected to provide the content 605. End nodes that are closer distance-wise to the client device 602 will typically have lower latency and will therefore transmit the data at a higher rate during the playback session 603.

Figure 8:
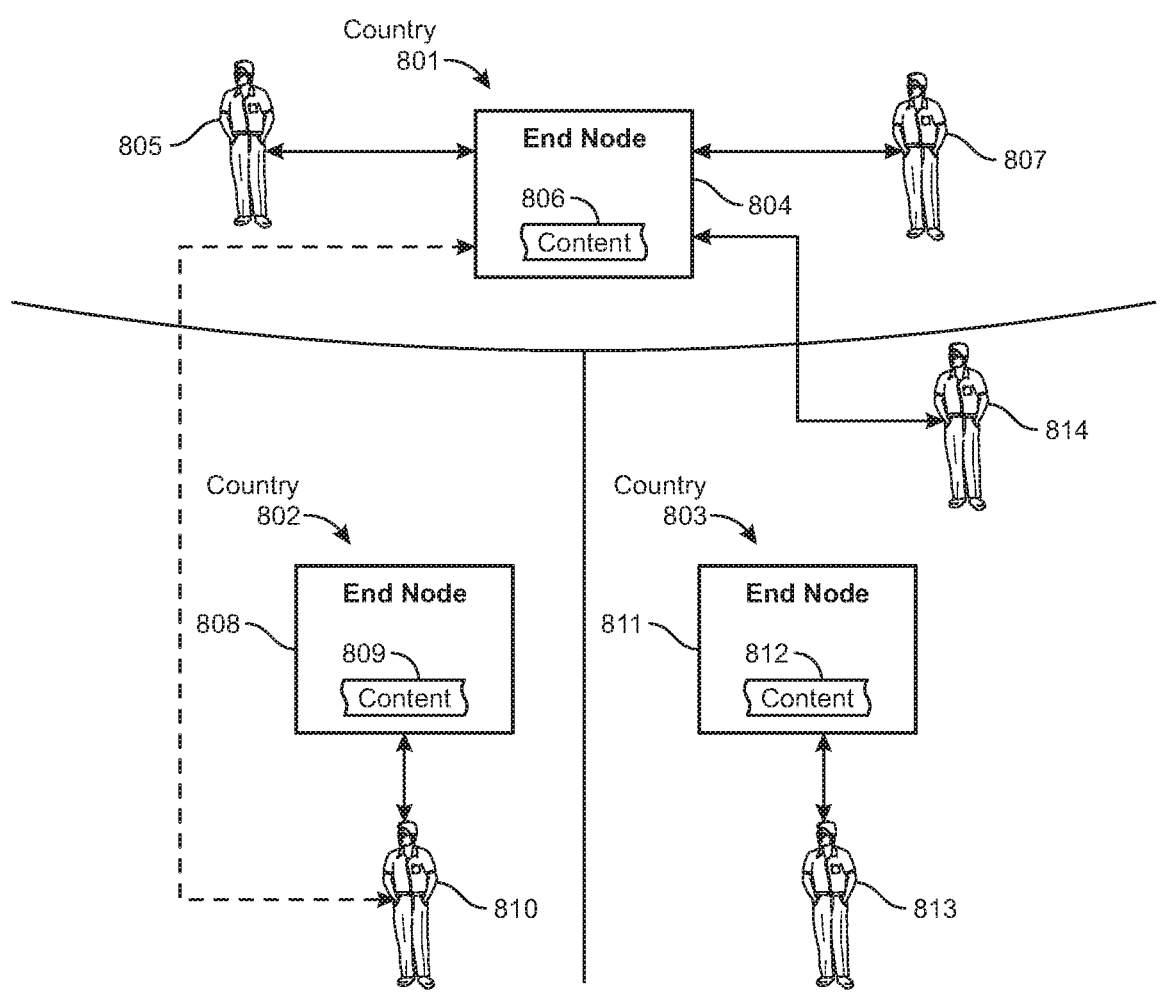
FIG. 8 illustrates an embodiment in which client electronic devices in different countries are steered to specific end nodes.

In some cases, as shown in FIG. 8, the location of the user (and the user's corresponding electronic device) are in a different country or state than the end node that is to provide a portion of requested content. Having end nodes and users in different countries presents different challenges, especially when some content is only licensed for certain countries, or when users have contracts with a network that does not have end nodes in a give country (or at least does not have end nodes with the requested content). For instance, users 805 and 807 are located in country 801, as is end node 804. Assuming users 805 and 807 request content 806 stored on end node 804, end node 804 will likely service these users' requests. If user 814 in country 803 requests content 806, that user could be routed to end node 811 which is in the same country or, if the content was not located on end node 811, that user's request may be routed to another end node (e.g., 804) in another country. As such, user requests may be routed to end nodes in other countries if the network steering factors (e.g., 701-704) indicate that the end node in that country is better suited to service the user's request for content.

Similarly, if user 813's request for content 812 is capable of being satisfied by end node 811 of the same country, that end node may be preferred over end nodes of other countries. In such cases, the network proximity steering factor 701 would indicate the preference for staying within the country. However, even in cases where that preference is in place (e.g., at end node 808 of country 802), if user 810's request for content 809 cannot be satisfied by end node 808, that user's request for content is forwarded (or directly sent) to an end node that can provide the content (in this case, end node 804).

While proximity to the client device is one steering factor looked at when determining why a given route through the network was used, many other steering factors may also be analyzed. For example, one of the outputs of the playback session is the location of the content 609. In FIG. 4, for example, some multimedia content is stored on end node 419A, other content is stored on node 419B, and other content is stored on node 419C. Some overlap of content will likely exist, but each end node will also include content that is not hosted on other end nodes. As such, when a request for content is received, the end node determining module 410 of FIG. 4 looks at steering factors 424 including the availability of content 702 at a given end node. Thus, even if, for example, end node 419A is physically closest to client device 414 and the network proximity steering factor 701 indicates that end node 419A is the optimal choice to provide the content, if node 419A does not have the requested content stored thereon, the content will need to be provided from another end node. Thus, in this example, the content availability steering factor 702 overrules or overrides the network proximity steering factor 701, and provides an indication of why, for example, end node 419B was used to provide the requested content.

In some cases, when a more obscure content request is received, that content is not located on any of the end nodes in the network and the request is sent to other nodes that fulfill the request. This transfer to nodes other than end nodes is an expensive process for entities that fill the end nodes with content. As such, each end node has a certain amount of content preloaded for provisioning to client devices. If the end nodes do not provide that content, and other edge nodes end up providing the content from another source, the content provider may need to pay for the costs of transferring requests to another network or to other nodes in the network. As such, ensuring that end nodes preload as much content as possible that is likely to be requested is important not only for providing a positive user experience, but also for keeping content provider costs down.

In some cases, content providers and/or ISPs use the amount of requests handled at the edge nodes as an indicator of how well an end node or group of end nodes are doing at satisfying client requests. If the transfer percentage is too high (e.g., beyond a specified threshold), the end nodes are not performing at their maximum ability. Accordingly, in some embodiments, the central computing system 401 determines an optimal end node hosting and serving capacity that will provision a maximal amount of multimedia requests using the end nodes, while minimizing the number of requests that are transferred to other nodes in the network. In some embodiments, this hosting and serving capacity includes an amount of storage space, an amount of allocated bandwidth or networking resources, an amount of CPU power, an amount of RAM, and or other computing characteristics that would affect an end node's ability to seamlessly stream content. Once this determined optimal amount of hosting and serving capacity has been determined, the computer system 401 or a system administrator instantiates an end node that has that determined optimal hosting and serving capacity that will provision a maximal amount of multimedia requests using the end nodes, while minimizing the amount of requests that are transferred to other nodes.

Another steering factor that indicates why a given route through the network was used to provide requested content 605 during the playback session 603 includes a computing resource health measurement 703 for the end node that was used to provide the multimedia content or for end nodes that were ultimately not selected to provide the requested content. Each end node (e.g., 604 or 419A-C) operates with a specific amount of computing resources including data storage, CPU capacity, available RAM, GPU capacity, network bandwidth, or other computing resources. If a particular end node is overloaded with requests, or loses a hard drive due to failure, or encounters network problems, that node would receive a low health measurement 703. Thus, if a request for content is received and, for example, node 419B is determined to be the closest to the client device 414 and is currently storing the requested content, if that node's health measurement 703 is too low (e.g., available bandwidth is too low, or available CPU or RAM or storage access time are too low), then another end node is selected to provide the requested content. Thus, again, the result of one steering factor (health 703) overrides the recommendation based on one or two other steering factors. This provides further insight into why a given end node or why another node altogether was used to provide a given portion of requested content.

The steering factors 700 also include a client switchaway factor 704. The client switchaway factor indicates that the client device 414 switched away from a given end node to another end node or switched away from the network entirely. For example, in some cases, the client device 414 is a mobile device such as a smart phone. In some cases, the user 415 is using the mobile device in a car, bus, train, or other transportation device. As such, the client device's location is changing and with the changing locations come transfer switches between cellular stations or towers. In some cases, switching between cellular stations causes a client device to switch to another end node or perhaps another network. If an end node goes down, or if the user changes their request and requests different content, or if the user switches networks (e.g., while traveling abroad), the client switchaway steering factor 704 indicates that circumstances related to the mobile device 414 have changed and that these changes have potentially caused route changes through the network. Accordingly, client switchaway 704 also provides insight as to why a given route was selected, and whether a more optimal end node should have been selected for the client device based on the other steering factors. Here, it will be recognized that, although four steering factors are listed in FIG. 7, many more steering factors may be identified and implemented in determining which end nodes are more optimally suited to provide a requested portion of content.

Figure 9:
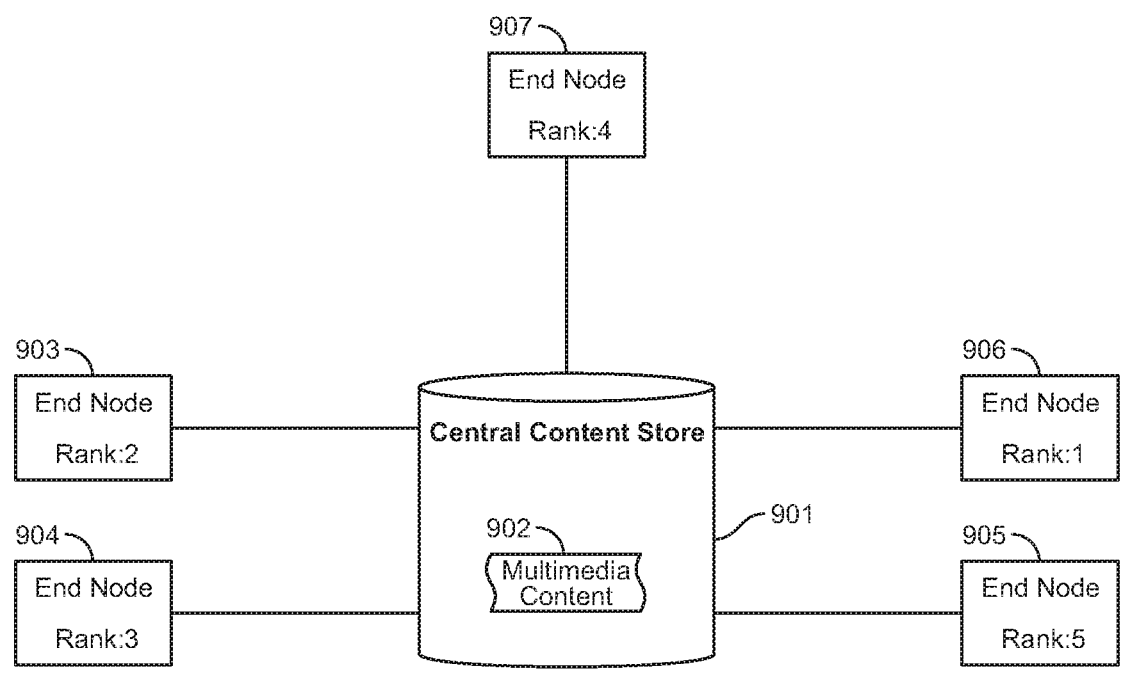
FIG. 9 illustrates an embodiment in which end nodes are ranked according to their ability to provide content to a specific client electronic device.

FIG. 9 illustrates an embodiment in which different end nodes are ranked according to their suitability to service a given request for content. For instance, when the central content store 901 receives a request for content 902, that central content store 901 is aware of the end nodes 903-907 to which it is connected. Each of these end nodes is subject to the steering factors 701-704 of FIG. 7, and each end node is better or worse suited to provide the requested content. In some cases, the central content store 901 analyzes the various steering factors 701-704 in relation to each end node 903-907 for a given request. In some cases, the analysis includes making a determination based on each steering factor, one at a time, and then combining the decisions from each level into a final decision or ranking on that end node's ability to quickly and seamlessly provide the requested content. Thus, in some cases, the highest-ranking end node (906) is the end node that is physically the closest to the end node that made the request. In other cases, the highest-ranking end node (906) currently has the requested content available and ready to serve. In still other cases, the highest-ranking node (906) has the best overall health. In one example, the highest-ranking node is an end node that is optimized for mobile devices. In other cases, the highest-ranking node is an end node that is optimized for stationary electronic devices. Other characteristics may also be used to determine the ranking. If an end node cannot be used for some reason, the central content store 901 steers the client's request to the next-highest-ranked node (e.g., 903), or the next (904), or the next (907), and so on. As noted in FIG. 6, the logic 610 used by the central content store 901 to rank the end nodes is provided as an output of a playback session. This ranking logic sheds additional light on why a given route through the network was used or why a given end node was selected to provide the requested content.

A corresponding system includes at least one physical processor and physical memory comprising computer-executable instructions that, when executed by the physical processor, cause the physical processor to: access information related to a playback session in which at least a portion of requested multimedia content is streamed over a network to a client electronic device. The accessed information includes one or more properties associated with the client electronic device. The network includes multiple end nodes that are each configured to host and serve multimedia content. The physical processor further accesses network topology information for the network to identify which route through the network was used to provide the requested multimedia content during the playback session, including indicating which end node was used to provide the multimedia content. The physical processor further accesses one or more network steering factors that indicate why the requested multimedia content was steered through the identified network route and determines, based on at least one of the network steering factors, which end node would have been more suited to providing the requested multimedia content for the playback session. The physical processor also transfers at least a portion of the requested multimedia content to the determined end node for provisioning during subsequent playback sessions.

A corresponding non-transitory computer-readable medium includes one or more computer-executable instructions that, when executed by at least one processor of a computing device, cause the computing device to: access information related to a playback session in which at least a portion of requested multimedia content is streamed over a network to a client electronic device. The accessed information includes one or more properties associated with the client electronic device. The network includes multiple end nodes that are each configured to host and serve multimedia content. The computing device also accesses network topology information for the network to identify which route through the network was used to provide the requested multimedia content during the playback session, including indicating which end node was used to provide the multimedia content. The computing device further accesses one or more network steering factors that indicate why the requested multimedia content was steered through the identified network route and determines, based on at least one of the network steering factors, which end node would have been more suited to providing the requested multimedia content for the playback session. The computing device also transfers at least a portion of the requested multimedia content to the determined end node for provisioning during subsequent playback sessions.

Accordingly, in this manner, the methods and systems described herein determine where to preload specified content and where to steer client requests not merely based on popularity or the number of streams from a given end node, but based on information about the client, information about the network, and information about the end nodes that stream the content. By looking not only at which data was served in the past, but looking also at why a given end node was used or why a given network route was used to service the client's request, the systems described herein distribute content to end nodes that are better suited to provide the content and steer client requests to those end nodes. In this manner, clients receive better and faster service, while content providers save money by avoiding content request transfers to nodes on other networks.

EXAMPLE EMBODIMENTS

1. A computer-implemented method comprising: accessing information related to a playback session in which at least a portion of requested multimedia content is streamed over a network to a client electronic device, the accessed information comprising one or more properties associated with the client electronic device, the network including a plurality of end nodes that are each configured to host and serve multimedia content; accessing network topology information for the network to identify which route through the network was used to provide the requested multimedia content during the playback session, including indicating which end node was used to provide the multimedia content; accessing one or more network steering factors that indicate why the requested multimedia content was steered through the identified network route; determining, based on at least one of the network steering factors, which end node would have been more suited to providing the requested multimedia content for the playback session; and transferring at least a portion of the requested multimedia content to the determined end node for provisioning during subsequent playback sessions.

2. The computer-implemented method of claim 1, further comprising: receiving a request from the client electronic device for one or more portions of multimedia content; and steering the received request to the determined end node to which the portion of requested multimedia content was transferred.

3. The computer-implemented method of claim 1, wherein the one or more network steering factors include at least one of a health indicator of the end node that provided the multimedia content, a distance indicator indicating a physical distance between the client electronic device and the end node that provided the multimedia content, an expected latency measurement between the client electronic device and the end node, or an agreement with an internet service provider (ISP) indicating an amount of multimedia content that is to be provided by the end node.

4. The computer-implemented method of claim 1, further comprising providing, as an output for each playback session, an indication of which of the plurality of end nodes would have been more suited to providing the requested multimedia content for the playback session.

5. The computer-implemented method of claim 1, further comprising providing, as an output for each playback session, an indication of which route through the network was used to provide the requested multimedia content during the playback session.

6. The computer-implemented method of claim 5, further comprising providing, as an output for each playback session, an indication of why the specified route through the network was used to provide the requested multimedia content during the playback session.

7. The computer-implemented method of claim 6, wherein the indication of why the specified route through the network was used to provide the requested multimedia content during the playback session specifies a computing resource health measurement for the end node that was used to provide the multimedia content.

8. The computer-implemented method of claim 6, wherein the indication of why the specified route through the network was used to provide the requested multimedia content during the playback session indicates that requested content was not available on a node that would have been more suited to providing the requested multimedia content for the playback session.

9. The computer-implemented method of claim 6, wherein the indication of why the specified route through the network was used to provide the requested multimedia content during the playback session indicates that the client electronic device switched to a second, different end node configured to host and serve multimedia content.

10. The computer-implemented method of claim 1, wherein the determined node comprises a multimedia content provisioning system.

11. The computer-implemented method of claim 10, wherein the multimedia content provisioning system includes a specified amount of preloaded multimedia content stored thereon.

12. A system comprising: at least one physical processor; physical memory comprising computer-executable instructions that, when executed by the physical processor, cause the physical processor to: access information related to a playback session in which at least a portion of requested multimedia content is streamed over a network to a client electronic device, the accessed information comprising one or more properties associated with the client electronic device, the network including a plurality of end nodes that are each configured to host and serve multimedia content; access network topology information for the network to identify which route through the network was used to provide the requested multimedia content during the playback session, including indicating which end node was used to provide the multimedia content; access one or more network steering factors that indicate why the requested multimedia content was steered through the identified network route; determine, based on at least one of the network steering factors, which end node would have been more suited to providing the requested multimedia content for the playback session; and transfer at least a portion of the requested multimedia content to the determined end node for provisioning during subsequent playback sessions.

13. The system of claim 12, further comprising: receiving a request from the client electronic device for one or more portions of multimedia content; determining a current physical location of the client electronic device; and ranking at least some of the plurality of end nodes on a scale based on which end nodes are closest to the current physical location of the client electronic device.

14. The system of claim 13, wherein the ranking is further based on whether the portions of multimedia content requested by the client electronic device are stored on each end node.

15. The system of claim 14, further comprising steering the received request to the end node with the highest ranking.

16. The system of claim 14, further comprising providing, as an output, one or more portions of ranking logic that were used when determining the ranking.

17. The system of claim 13, wherein the request received from the client electronic device is steered to an end node that is optimized for specific types of electronic devices.

18. The system of claim 12, further comprising determining an optimal end node hosting and serving capacity that will provision a maximal amount of multimedia requests using the end nodes, while minimizing the number of requests that are transferred to other nodes.

19. The system of claim 18, further comprising: instantiating an end node that has the determined optimal hosting and serving capacity that will provision a maximal amount of multimedia requests using the end nodes, while minimizing the number of requests that are transferred to other nodes; and transferring at least a portion of multimedia content to the determined end node for provisioning during subsequent playback sessions.

20. A non-transitory computer-readable medium comprising one or more computer-executable instructions that, when executed by at least one processor of a computing device, cause the computing device to: access information related to a playback session in which at least a portion of requested multimedia content is streamed over a network to a client electronic device, the accessed information comprising one or more properties associated with the client electronic device, the network including a plurality of end nodes that are each configured to host and serve multimedia content; access network topology information for the network to identify which route through the network was used to provide the requested multimedia content during the playback session, including indicating which end node was used to provide the multimedia content; access one or more network steering factors that indicate why the requested multimedia content was steered through the identified network route; determine, based on at least one of the network steering factors, which end node would have been more suited to providing the requested multimedia content for the playback session; and transfer at least a portion of the requested multimedia content to the determined end node for provisioning during subsequent playback sessions.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine a network route used to provide multimedia content, use the result of the transformation to identify a node better suited to provide the multimedia content, and store the result of the transformation to steer multimedia content to provisioning servers and steer requests to those provisioning servers. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing information related to a playback session in which at least a portion of requested multimedia content is streamed over a network to a client electronic device, the accessed information comprising one or more properties associated with the client electronic device, the network including a plurality of end nodes that are each configured to host and serve multimedia content;
   accessing network topology information for the network to identify which route through the network was used to provide the requested multimedia content during the playback session, including indicating which end node was used to provide the multimedia content;
   accessing one or more network steering factors that indicate why the requested multimedia content was steered through the identified network route;
   determining, based on at least one of the network steering factors, which end node would have been more suited to providing the requested multimedia content for the playback session; and
   transferring at least a portion of the requested multimedia content to the determined end node, such that the determined end node to which the requested multimedia content was transferred provisions the requested multimedia content during subsequent playback sessions.

2. The computer-implemented method of claim 1, further comprising:
receiving a request from the client electronic device for one or more portions of multimedia content; and
steering the received request to the determined end node to which the portion of requested multimedia content was transferred.

3. The computer-implemented method of claim 1, wherein the one or more network steering factors include at least one of a health indicator of the end node that provided the multimedia content, a distance indicator indicating a physical distance between the client electronic device and the end node that provided the multimedia content, an expected latency measurement between the client electronic device and the end node, or an agreement with an internet service provider (ISP) indicating an amount of multimedia content that is to be provided by the end node.

4. The computer-implemented method of claim 1, further comprising providing, as an output for each playback session, an indication of which of the plurality of end nodes would have been more suited to providing the requested multimedia content for the playback session.

5. The computer-implemented method of claim 1, further comprising providing, as an output for each playback session, an indication of which route through the network was used to provide the requested multimedia content during the playback session.

6. The computer-implemented method of claim 5, further comprising providing, as an output for each playback session, an indication of why the specified route through the network was used to provide the requested multimedia content during the playback session.

7. The computer-implemented method of claim 6, wherein the indication of why the specified route through the network was used to provide the requested multimedia content during the playback session specifies a computing resource health measurement for the end node that was used to provide the multimedia content.

8. The computer-implemented method of claim 6, wherein the indication of why the specified route through the network was used to provide the requested multimedia content during the playback session indicates that requested content was not available on a node that would have been more suited to providing the requested multimedia content for the playback session.

9. The computer-implemented method of claim 6, wherein the indication of why the specified route through the network was used to provide the requested multimedia content during the playback session indicates that the client electronic device switched to a second, different end node configured to host and serve multimedia content.

10. The computer-implemented method of claim 1, wherein the determined node comprises a multimedia content provisioning system.

11. The computer-implemented method of claim 10, wherein the multimedia content provisioning system includes a specified amount of preloaded multimedia content stored thereon.

12. A system comprising:
at least one physical processor;
physical memory comprising computer-executable instructions that, when executed by the physical processor, cause the physical processor to:
access information related to a playback session in which at least a portion of requested multimedia content is streamed over a network to a client electronic device, the accessed information comprising one or more properties associated with the client electronic device, the network including a plurality of end nodes that are each configured to host and serve multimedia content;
access network topology information for the network to identify which route through the network was used to provide the requested multimedia content during the playback session, including indicating which end node was used to provide the multimedia content;
access one or more network steering factors that indicate why the requested multimedia content was steered through the identified network route;
determine, based on at least one of the network steering factors, which end node would have been more suited to providing the requested multimedia content for the playback session; and
transfer at least a portion of the requested multimedia content to the determined end node, such that the determined end node to which the requested multimedia content was transferred provisions the requested multimedia content during subsequent playback sessions.

13. The system of claim 12, further comprising:
receiving a request from the client electronic device for one or more portions of multimedia content;
determining a current physical location of the client electronic device; and
ranking at least some of the plurality of end nodes on a scale based on which end nodes are closest to the current physical location of the client electronic device.

14. The system of claim 13, wherein the ranking is further based on whether the portions of multimedia content requested by the client electronic device are stored on each end node.

15. The system of claim 14, further comprising steering the received request to the end node with the highest ranking.

16. The system of claim 14, further comprising providing, as an output, one or more portions of ranking logic that were used when determining the ranking.

17. The system of claim 13, wherein the request received from the client electronic device is steered to an end node that is optimized for specific types of electronic devices.

18. The system of claim 12, further comprising determining an optimal end node hosting and serving capacity that will provision a maximal amount of multimedia requests using the end nodes, while minimizing the number of requests that are transferred to other nodes.

19. The system of claim 18, further comprising:
instantiating an end node that has the determined optimal hosting and serving capacity that will provision a maximal amount of multimedia requests using the end nodes, while minimizing the number of requests that are transferred to other nodes; and
transferring at least a portion of multimedia content to the determined end node for provisioning during subsequent playback sessions.

20. A non-transitory computer-readable medium comprising one or more computer-executable instructions that, when executed by at least one processor of a computing device, cause the computing device to:
access information related to a playback session in which at least a portion of requested multimedia content is streamed over a network to a client electronic device, the accessed information comprising one or more properties associated with the client electronic device, the network including a plurality of end nodes that are each configured to host and serve multimedia content;

access network topology information for the network to identify which route through the network was used to provide the requested multimedia content during the playback session, including indicating which end node was used to provide the multimedia content;

access one or more network steering factors that indicate why the requested multimedia content was steered through the identified network route;

determine, based on at least one of the network steering factors, which end node would have been more suited to providing the requested multimedia content for the playback session; and transfer at least a portion of the requested multimedia content to the determined end node, such that the determined end node to which the requested multimedia content was transferred provisions the requested multimedia content during subsequent playback sessions.

* * * * *